(12) United States Patent
Ho

(10) Patent No.: US 11,405,221 B2
(45) Date of Patent: *Aug. 2, 2022

(54) RETENTION AND REVOCATION OF OPERATION KEYS BY A CONTROL UNIT

(71) Applicant: TEXAS INSTRUMENTS INCORPORATED, Dallas, TX (US)

(72) Inventor: Jin-Meng Ho, Plano, TX (US)

(73) Assignee: Texas Instmments Incorporated, Dallas, TX (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/589,433

(22) Filed: Oct. 1, 2019

(65) Prior Publication Data

US 2020/0052910 A1 Feb. 13, 2020

Related U.S. Application Data

(63) Continuation of application No. 15/632,820, filed on Jun. 26, 2017, now Pat. No. 10,432,408, which is a
(Continued)

(51) Int. Cl.
*H04L 29/06* (2006.01)
*H04L 9/32* (2006.01)
(Continued)

(52) U.S. Cl.
CPC ............ *H04L 9/3268* (2013.01); *B60R 25/10* (2013.01); *B60R 25/24* (2013.01); *G06F 21/10* (2013.01);
(Continued)

(58) Field of Classification Search
CPC ... H04L 9/3268; H04L 9/0827; H04L 9/0861; H04L 9/0891; H04L 9/0894; H04L 9/3226; H04L 2209/84; G07C 9/20; B60R 25/24
See application file for complete search history.

(56) References Cited

U.S. PATENT DOCUMENTS 5,377,270 A 12/1994 Koopman, Jr. et al.
5,675,622 A 10/1997 Hewitt et al.
(Continued)

FOREIGN PATENT DOCUMENTS

CN 1575474 A 2/2005
CN 201570073 U 9/2010
(Continued)

OTHER PUBLICATIONS

Chinese Office Action for 201810651002.5 dated Jul. 27, 2020.
Japanese Office Action for JP Application No. 2018-110814 dated Mar. 23, 2020.

*Primary Examiner* — Sher A Khan
(74) *Attorney, Agent, or Firm* — Brian D. Graham; Charles A. Brill; Frank D. Cimino

(57) ABSTRACT

An electronic key fob device, in one embodiment, includes a transmitter, a counter configured to provide a current counter value indicated by a plurality of bits, a memory configured to store an operation key, and a processor coupled to the transmitter and memory. The processor is configured to encrypt the current counter value using the operation key to produce an encrypted counter value, select a subset of the plurality of bits of the current counter value, transmit a message the includes the encrypted counter value and the subset of plurality of bits of the current counter value.

20 Claims, 3 Drawing Sheets

Related U.S. Application Data continuation of application No. 15/090,125, filed on Apr. 4, 2016, now Pat. No. 9,698,980, which is a continuation of application No. 13/969,133, filed on Aug. 16, 2013, now Pat. No. 9,306,743.

(60) Provisional application No. 61/695,155, filed on Aug. 30, 2012.

(51) Int. Cl.
  *B60R 25/10* (2013.01)
  *H04L 9/08* (2006.01)
  *G07C 9/20* (2020.01)
  *G06F 21/10* (2013.01)
  *B60R 25/24* (2013.01)

(52) U.S. Cl.
  CPC .............. *G07C 9/20* (2020.01); *H04L 9/0827* (2013.01); *H04L 9/0861* (2013.01); *H04L 9/0891* (2013.01); *H04L 9/0894* (2013.01); *H04L 9/3226* (2013.01); *H04L 2209/84* (2013.01)

(56) References Cited

U.S. PATENT DOCUMENTS

| | | |
|---|---|---|
| 6,377,173 B1 | 4/2002 | Desai |
| 6,829,357 B1 | 12/2004 | Alrabady et al. |
| 6,968,458 B1* | 11/2005 | Ruddle ............... H04L 63/0442 |
| | | 713/168 |
| 8,051,085 B1 | 11/2011 | Srinivasan et al. |
| 8,069,350 B2 | 11/2011 | Nowottnick |
| 8,132,024 B2* | 3/2012 | Nakano ................. H04L 9/0822 |
| | | 713/193 |
| 8,700,899 B1* | 4/2014 | Juels ..................... H04L 9/0897 |
| | | 713/167 |
| 2002/0141594 A1* | 10/2002 | MacKenzie ............. H04L 9/302 |
| | | 380/286 |
| 2003/0046536 A1 | 3/2003 | Bruekers et al. |
| 2003/0129949 A1 | 7/2003 | Selektor |
| 2005/0015286 A1 | 1/2005 | Rudnik et al. |
| 2005/0041813 A1 | 2/2005 | Forest et al. |
| 2005/0071631 A1 | 3/2005 | Langer |
| 2005/0160272 A1 | 7/2005 | Teppler |
| 2005/0187882 A1 | 8/2005 | Sovio et al. |
| 2005/0198528 A1 | 9/2005 | Unger |
| 2005/0228988 A1 | 10/2005 | Traw et al. |
| 2005/0248436 A1* | 11/2005 | Hohmann ............... B60R 25/24 |
| | | 340/5.72 |
| 2006/0078110 A1 | 4/2006 | Kim et al. |
| 2006/0109985 A1 | 5/2006 | Lotspiech |
| 2006/0126848 A1 | 6/2006 | Park et al. |
| 2007/0016798 A1 | 1/2007 | Narendra et al. |
| 2007/0086593 A1* | 4/2007 | Denning ............... H04L 9/0872 |
| | | 380/286 |
| 2007/0121938 A1 | 5/2007 | Yoon |
| 2007/0174609 A1 | 7/2007 | Han et al. |
| 2007/0186105 A1 | 8/2007 | Bailey et al. |
| 2007/0230702 A1* | 10/2007 | Puri .................. H04W 12/0431 |
| | | 380/270 |
| 2007/0234059 A1 | 10/2007 | Ohara |
| 2007/0266258 A1* | 11/2007 | Brown .................. H04L 9/0822 |
| | | 713/183 |
| 2008/0017705 A1 | 1/2008 | Costello et al. |
| 2008/0065892 A1 | 3/2008 | Bailey et al. |
| 2008/0256365 A1 | 10/2008 | Ecklander et al. |
| 2009/0217035 A1* | 8/2009 | Abdul Hameed Khan ................. |
| | | G06Q 20/4014 |
| | | 713/168 |
| 2009/0232310 A1* | 9/2009 | Holtmanns ....... H04W 12/0431 |
| | | 380/277 |
| 2009/0284345 A1 | 11/2009 | Ghabra et al. |
| 2009/0304185 A1 | 12/2009 | Ju et al. |
| 2010/0031318 A1 | 2/2010 | Gardcia et al. |
| 2010/0199095 A1 | 8/2010 | Ho |
| 2010/0208894 A1 | 8/2010 | Prochaska et al. |
| 2010/0290627 A1 | 11/2010 | Tsuji et al. |
| 2011/0310290 A1 | 12/2011 | Uchida et al. |
| 2011/0320809 A1 | 12/2011 | Amendola et al. |
| 2012/0066773 A1 | 3/2012 | Weisberger |
| 2012/0124374 A1 | 5/2012 | Murray |
| 2012/0252365 A1 | 10/2012 | Lam |
| 2012/0280783 A1 | 11/2012 | Gerhardt et al. |
| 2013/0083722 A1 | 4/2013 | Bhargava et al. |
| 2013/0160086 A1 | 6/2013 | Katar et al. |
| 2013/0182845 A1 | 7/2013 | Monica et al. |
| 2014/0091903 A1 | 4/2014 | Birkel et al. |

FOREIGN PATENT DOCUMENTS

| | | |
|---|---|---|
| CN | 202300776 U | 7/2012 |
| JP | 2006233530 A | 9/2006 |
| JP | 2008050885 | 3/2008 |
| JP | 2008-193575 | 8/2008 |
| JP | 2008193575 A | 8/2008 |
| JP | 2008262299 | 10/2008 |
| JP | 2010-179834 | 8/2010 |
| JP | 2010179834 A | 8/2010 |

* cited by examiner

RETENTION AND REVOCATION OF OPERATION KEYS BY A CONTROL UNIT

CROSS-REFERENCE TO RELATED APPLICATIONS

This application is a continuation of and claims priority to U.S. patent application Ser. No. 15/632,820 filed on Jun. 26, 2017, which is continuation of and claims priority to U.S. patent application Ser. No. 15/090,125 filed on Apr. 4, 2016, which is a continuation of and claims priority to U.S. patent application Ser. No. 13/969,133 filed on Aug. 16, 2013, now issued U.S. Pat. No. 9,306,743, which claims priority to U.S. Provisional Patent Application No. 61/695,155, titled "ONE-WAY KEYFOB—VEHICLE KEY VERIFICATION, RETENTION, AND REVOCATION" and filed on Aug. 30, 2012, the disclosures of which are all hereby incorporated by reference in their entireties.

TECHNICAL FIELD

Embodiments of the invention are directed, in general, to security and, more specifically, to methods for key fob vehicle operation key verification, retention, and revocation.

BACKGROUND

Key fobs may be paired with a control unit, such as vehicle control unit, to perform well-known actions such as opening/closing and locking/unlocking vehicle doors. The key fob may be capable of transmitting only, which limits the authentication processes available through a challenge message sent from the control unit to verify the commands sent by a key fob due to the inability for two-way communications. A control unit must be able to verify the validity of received commands and to reject unauthorized commands, including replays of earlier transmissions from a valid key fob.

Occasionally, a key fob will be lost or its holder may no longer be authorized to access the control unit. In this situation, there must be a process that allows the control unit to identify which key fobs are still valid and which should be ignored.

SUMMARY

Embodiments of the invention provide methods for key fob to control unit verification, retention, and revocation. After an initial pairing, a key fob and a vehicle control unit share a secret operation key (OpKey). For verification, the key fob sends an identifier, which may be the 8 lowest-order bits of a 128-bit counter, and some bits of the AES-128, OpKey-encrypted value of the counter to the control unit.

After one or more key fobs are paired with a control unit, such as vehicle control unit, the key fobs each have their own OpKey secretly shared with the control unit. A key fob needs to verify possession of a shared OpKey to the control unit in order for the control unit to take a prescribed action, such as unlocking/locking or opening/closing vehicle doors. This invention solves this problem even though key fobs are capable of transmitting but not receiving. Additionally, the embodiments described herein prevent third parties from impersonating a legitimate key fob by replaying an earlier transmitted message. In addition, after a key fob is lost, its OpKey may be revoked while the OpKey of the remaining or new key fobs may be retained.

For OpKey revocation and retention, a remaining or new key fob is prompted by a legitimate control unit user to send a verification message to the control unit. The control unit is then prompted to enter an OpKey retention and revocation mode. Subsequently, each of the remaining or new key fobs is prompted by the user to send a verification message to the control unit. The control unit is finally prompted to exit the OpKey retention and revocation mode, retaining only the OpKeys of the key fobs from which it received a valid verification message immediately before entering and during the OpKey retention and revocation mode, respectively.

BRIEF DESCRIPTION OF THE DRAWINGS

Figure 1:
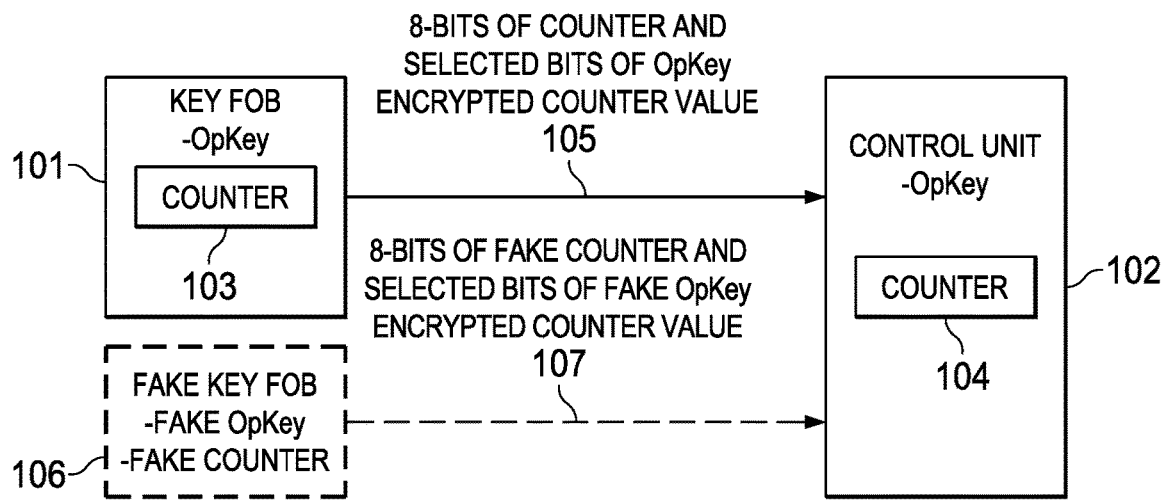

Having thus described the invention in general terms, reference will now be made to the accompanying drawings, wherein:

FIG. 1 illustrates a normal operation of a key fob and a control unit.

Figure 2:
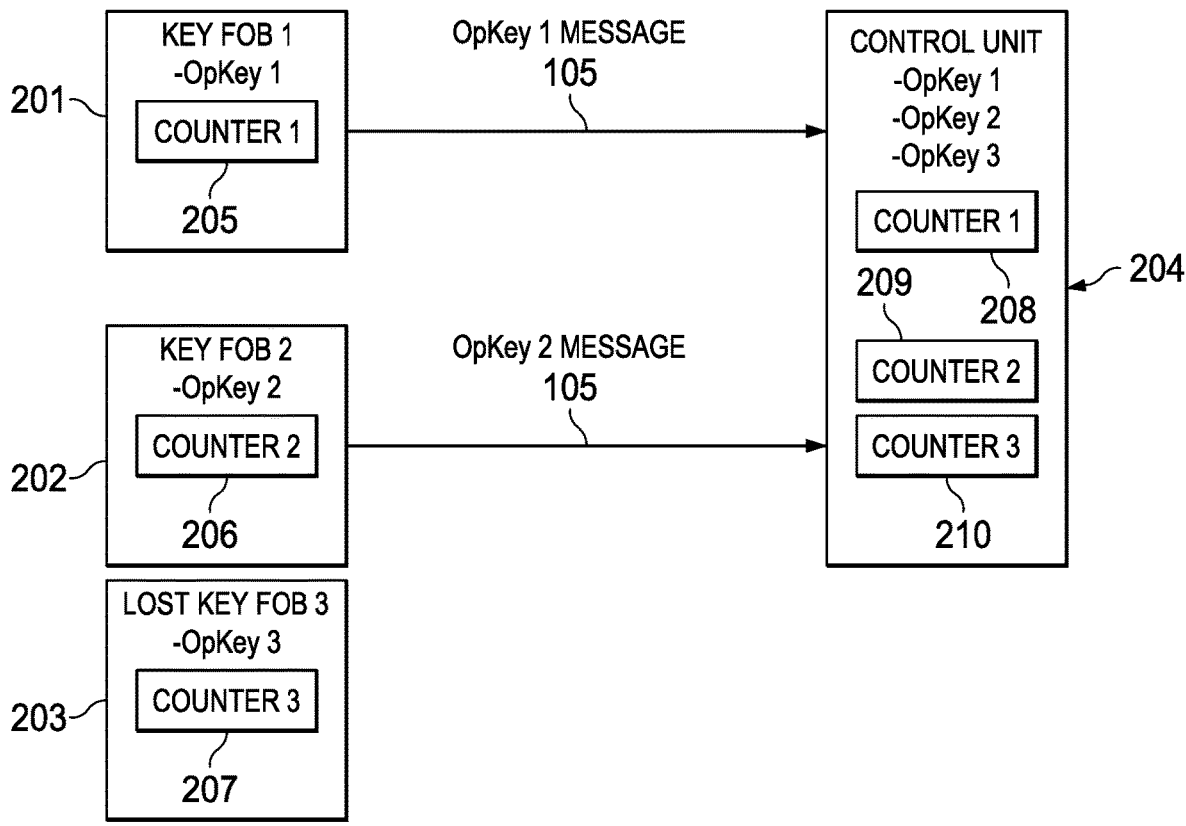

FIG. 2 illustrates a key fob retention and revocation process that can be used to deactivate a key fob in one embodiment.

Figure 3:
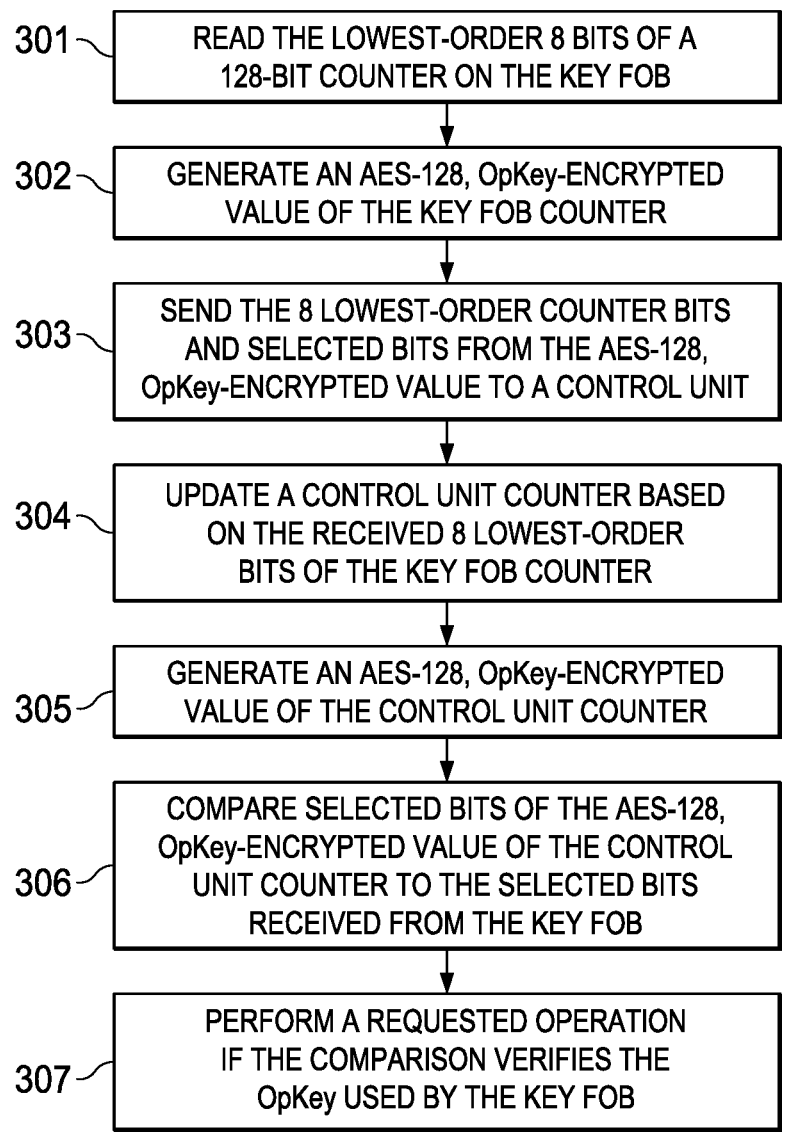

FIG. 3 is a flowchart illustrating normal operation of a key fob and control unit using OpKey verification according to one embodiment.

Figure 4:
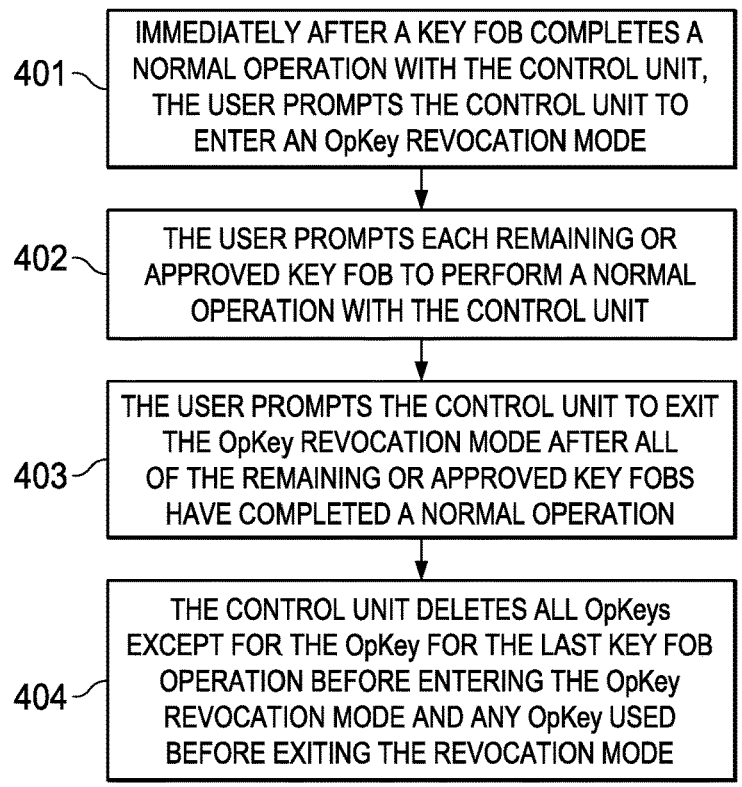

FIG. 4 is a flowchart illustrating a process for retention and revocation of OpKeys.

Figure 5:
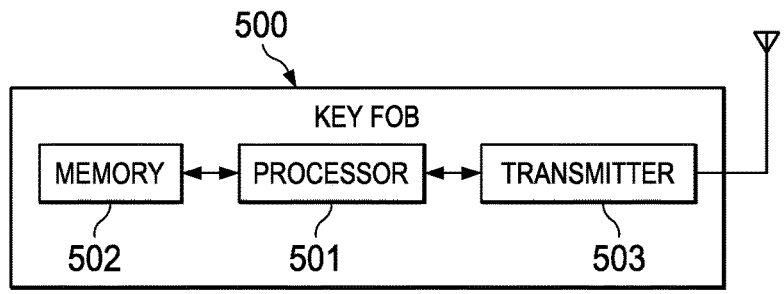

FIG. 5 is a block diagram of an example key fob according to one embodiment.

Figure 6:
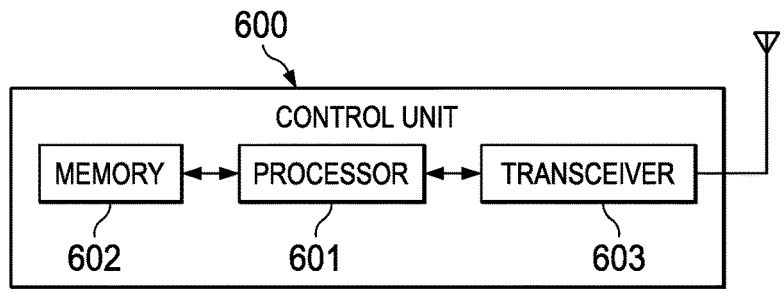

FIG. 6 is a block diagram of an example control unit according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the invention enable a key fob capable of transmitting, but not receiving, to verify its possession of a secret OpKey to a vehicle control unit, while preventing a third party from impersonating a legitimate key fob by replaying a message sent out earlier by the key fob to the control unit for verification. In addition, the invention also allows a legitimate vehicle user to revoke the OpKey of a lost or expired key fob but retain the OpKey of each remaining valid key fob.

FIG. 1 illustrates a normal operation of a key fob 101 and a control unit 102. After an initial pairing, key fob 101 and a control unit 102 share a secret OpKey. For example, key fob 101 and control unit 102 may be paired using the systems and methods disclosed in pending U.S. patent application Ser. No. 13/969,154, filed Aug. 16, 2013, title "One-Way Key Fob and Vehicle Pairing," the disclosure of which is hereby incorporated by reference herein in its entirety.

In addition to the OpKey that is shared between both key fob 101 and control unit 102, both devices have a 128-bit counter 103, 104. In other embodiments, counters of different sizes may be used. In normal operation, key fob 101 creates an AES-128, OpKey-encrypted value of counter 103. Key fob 101 then transmits (105) the 8 lowest-order bits of 128-bit counter 103 and some predetermined bits of the AES-128, OpKey-encrypted value of counter 103 to control unit 102. The key fob increments its counter value by one after each transmission, starting from an initial counter value, such as one. The transmission of message 105 itself may represent a command from key fob 101, such as unlock/lock vehicle doors. Alternatively, a separate command data field may be included in message 105 to identify the desired command from key fob 101.

Upon receiving message 105, control unit 102 uses the 8 counter bits received from key fob 101 to set the 8 lowest-order bits of 128-bit counter 104, and increments the value of the remaining bits of counter 104 by one if the value of the received 8 bits is not larger than the value of the 8 lowest-order bits of counter 104. Additionally, control unit 102 creates an AES-128, OpKey encrypted value of counter 104. Control unit 102 then compares predetermined bits from its OpKey encrypted value of counter 104 to the bits representing an OpKey-encrypted value of counter 103. Control unit 102 verifies the message 105 and hence the OpKey if these bits match.

If the verification fails, control unit 102 restores counter 104 to the value before the change.

If an unauthorized or fake key fob 106 attempts to send a message 107 to control unit 102 without being paired, control unit 102 will reject the message 107. Fake key fob 106 does not have a valid OpKey for control unit 102. Additionally, fake key fob 106 does not know the proper counter value for control unit 102 to use for a valid message.

FIG. 2 illustrates a key fob retention and revocation process that can be used to deactivate a key fob in one embodiment. In this example, three key fobs 201-203 are paired with the same control unit 204. Each paired key fob 201-203 has a unique, secret OpKey (OpKey1, OpKey2, OpKey3) that is shared with control unit 204. Additionally, each key fob 201-203 has its own counter 205-207. Control unit 204 maintains a separate counter 208-210 for each key fob 201-203.

When a key fob 203 is lost or needs to be revoked, a user may perform the following steps. First, the user prompts control unit 204 to enter an OpKey revocation mode. The OpKey revocation mode may be triggered by a message from a remaining key fob 201, 202 or/and by some other input to control unit 204.

While the control unit 204 is in the OpKey revocation mode, the user prompts each remaining key fob 201, 202 to perform a normal operation with control unit 204. For example, each key fob 201, 202 will send a message derived from its OpKey to control unit 204, such as message 105 (FIG. 1). After each remaining key fob 201, 202 has sent its message or performed an operation with control unit 204, the user prompts the control unit to exit the OpKey retention mode. Because key fob 203 is lost or no longer authorized, it will not send a message during the revocation mode.

The control unit 204 retains only the OpKeys that were received before exiting the revocation mode. In one embodiment, the control unit 204 retains the last OpKey received before entering revocation mode and all OpKeys received during revocation mode. In other embodiments, control unit 204 retains only the OpKeys received during the revocation mode. All other OpKeys (e.g., OpKey 3) are deleted by control unit 204. This prevents the lost or unauthorized from operating with control unit 204 after the revocation procedure.

FIG. 3 is a flowchart illustrating a process for normal operation of a key fob and control unit using OpKey verification. In step 301, the key fob reads the 8 lowest-order bits of a 128-bit counter. In step 302, the key fob generates an AES-128, OpKey-encrypted value of the key fob counter. The 8 lowest-order bits and some selected bits from the AES-128, OpKey-encrypted value of the key fob counter are sent to the control unit in step 303. This information may be associated with a particular command or request by the key fob.

In step 304, the control unit updates a control unit counter based on the 8 lowest-order bits received from the key fob. According to one embodiment, the update is done by setting the 8 lowest-order bits of a control unit counter to the received 8 lowest-order bits of the key fob counter, and by incrementing the value of the remaining bits of the control unit counter by one if the value of the received bits of the key fob counter is not larger than the value of the corresponding bits of the control unit counter. In step 305, the control unit generates an AES-128, OpKey-encrypted value of the updated control unit counter. The control unit compares selected bits of the AES-128, OpKey-encrypted value of the control unit counter to the selected bits of the AES-128, OpKey-encrypted value of the key fob counter that were received from the key fob.

The control unit verifies the command or request from the key fob if the selected bits match, which indicates that both devices used the same OpKey and counter value.

FIG. 4 is a flowchart illustrating a process for retention and revocation of OpKeys. In step 401, immediately after a remaining (i.e., not lost) or new key fob completes a normal operation, the user prompts the control unit to enter an OpKey revocation mode. The user then prompts each remaining or approved key fob to perform a normal operation with the control unit. The normal operation may involve a transmission as illustrated in FIGS. 1 and 3 or any operation that allows the key fob to send an OpKey encrypted value to the control unit.

In step 403, the user prompts the control unit to exit the OpKey revocation mode after all of the remaining or approved key fobs have completed a normal operation. For example, the user may activate an "end" button to exit the revocation mode, or the revocation mode may end after a set period of time.

In step 404, the control unit deletes all OpKeys except the OpKey associated with the last key fob that operated before entering the OpKey revocation mode and any OpKey associated with a key fob used before the revocation mode ended. Because a lost or unapproved key fob would be unlikely to operate during the brief revocation mode duration, the OpKeys for the lost or unapproved devices would be deleted from the control unit. As a result, the lost and unapproved devices are no longer paired with the control unit and could no longer be used to send commands to the control unit. In another embodiment, only the OpKeys associated with key fobs that operate during the revocation mode are retained, and all other OpKeys that do not perform an operation during the revocation mode period are deleted.

FIGS. 5 and 6 are block diagrams of an example key fob 500 and control unit 600, respectively. The key fob 400 and control unit 600 each comprise a processor 501, 601, a memory 502, 602, and a transceiver 603 or transmitter 503. The processors 501, 601 of the devices may be used to perform normal operations such as maintaining and updating counters, generating OpKey encrypted values, and comparing such values to verify that only OpKeys from paired devices are used. The processors may be a standard CPU, a microcontroller, a low-power digital signal processor, etc. and may be capable of performing complex calculations in a short time.

The memories 502, 602 of the devices may be used to store OpKeys, counter values, encrypted values, and other bits exchanged between the key fob and control unit. The memories may be a non-volatile storage device such as a flash memory or an EEPROM.

The key fob transmitter 503 and control unit transceiver 603 may be wired (not shown), wireless, or capable of both. The transceiver and transmitter may be used by the devices to communicate counter values, OpKey-encrypted data, and other bits during normal operation and during a revocation mode. The key fob allows for remote entry and control of vehicles or other devices and may use wireless technology, such as Bluetooth, LF, or UHF, for those transmissions. The key fob transmitter 503 is capable of transmitting only and does not receive signals from the control unit 600.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A control unit device comprising:
   a receiver;
   a memory configured to store one or more operation keys and program instructions; and
   a processor coupled to the receiver and the memory;
   wherein the program instructions are executable by the processor to cause the control unit device to, in response to a revocation command received by the receiver, perform a revocation process by, for each of the one or more operation keys currently stored in the memory:
      determining, for the respective operation key, whether the control unit device receives a respective message transmitted by a respective transmitting device that was encrypted by the respective operation key during the revocation process;
      if the respective message is received during the revocation process, retaining the respective operation key in the memory; and
      if the respective message is not received during the revocation process, deleting the respective operation key from the memory.

2. The control unit device of claim 1, wherein the memory stores a control unit counter, and wherein the program instructions are executable by the processor to cause the control unit device to:
   receive, using the receiver, a first message including a predetermined number of bits of a first value encrypted by a first transmitting device using a first operation key of the one or more operation keys and a command data field;
   generate an encrypted value of the control unit counter using the first operation key;
   determine whether the predetermined number of bits of the first value as encrypted using the first operation key matches corresponding bits of the encrypted value of the control unit counter; and
   perform a command indicated by the command data field when the predetermined number of bits of the first value as encrypted using the first operation key matches the corresponding bits of the encrypted value of the control unit counter.

3. The control unit device of claim 2, wherein the command data field indicates the revocation command.

4. The control unit device of claim 3, wherein the control unit device retains the first operation key in the memory when performing the revocation process.

5. The control unit device of claim 2, wherein the first message additionally includes a chosen number of lowest-order bits of the first value, and the control unit device updates the control unit counter based on the lowest-order bits of the first value before generating the encrypted value of the control unit counter using the first operation key.

6. The control unit device of claim 5, wherein the first value is a counter value of a key fob device that is paired with the control unit device.

7. The control unit device of claim 1, wherein the revocation process further includes:
   identifying an operation key associated with a last message received by the control unit device immediately prior to receiving the revocation command to perform the revocation process as a selected operation key; and
   retaining the operation key in the memory.

8. The control unit device of claim 7, wherein the last message specifies to lock or unlock a vehicle lock.

9. The control unit device of claim 2, wherein the program instructions are executable by the processor to cause the control unit device to generate the encrypted value of the control unit counter using the first operation key by applying an Advanced Encryption Standard (AES) encryption operation.

10. The control unit device of claim 2, wherein the program instructions are executable by the processor to cause the control unit device to generate the encrypted value of the control unit counter using the first operation key by applying an Advanced Encryption Standard-128 (AES-128) encryption operation.

11. The control unit device of claim 2, wherein the first message further includes a predetermined number of bits of the first value in an unencrypted form.

12. The control unit device of claim 2, wherein the first message further includes a predetermined number of lowest-order bits of the first value in an unencrypted form.

13. A device comprising:
    a processor; and
    a memory coupled to the processor, wherein:
       the memory is configured to store a set of operation keys each associated with a respective transmitting device of a set of transmitting devices; and
       the memory stores instructions that, when executed, cause the processor to:
          receive a prompt to enter a revocation mode; and
          based on the prompt, for each key of the set of operation keys currently stored in the memory:
             determine whether a message encrypted by the respective key has been received from the respective transmitting device while in the revocation mode; and
             determine whether to delete or retain the respective key based on whether the message encrypted by the respective key has been received from the respective transmitting device while in the revocation mode.

14. The device of claim 13, wherein the instructions further cause the processor to:
    receive a first message from a first transmitting device of the set of transmitting devices prior to the receiving of the prompt to enter the revocation mode, wherein the first message is encrypted by a first key of the set of operation keys; and determine to retain in the memory the first key based on the first message received prior to the prompt to enter the revocation mode.

15. The device of claim 14, wherein the first message specifies to lock or unlock a vehicle lock.

16. The device of claim 13 further comprising a set of counters, wherein:

each counter of the set of counters is associated with a respective transmitting device of the set of transmitting devices; and the instructions to determine whether a message encrypted by a respective key of the set of operation keys has been received from the respective transmitting device further cause the processor to:

receive a first message that specifies a portion of a first counter value in an encrypted form and a portion of the first counter value in an unencrypted form;

set a second counter value of a first counter of the set of counters based on the portion of the first counter value in the unencrypted form;

encrypt the second counter value using the respective key to produce the second counter value in an encrypted form; and determine whether the first message was received from the respective transmitting device based on a comparison of the second counter value in the encrypted form and the portion of the first counter value in the encrypted form.

17. The device of claim 16, wherein the portion of the first counter value in the unencrypted form is a predetermined number of lowest-order bits of the first counter value.

18. The device of claim 16, wherein:

the first counter value has a length of 128 bits; and the portion of the first counter value in the unencrypted form has a length of 8 bits.

19. The device of claim 16, wherein the instructions cause the processor to encrypt the second counter value using the respective key according to an Advanced Encryption Standard (AES) technique to produce the second counter value in the encrypted form.

20. The device of claim 16, wherein the instructions cause the processor to encrypt the second counter value using the respective key according to and Advanced Encryption Standard-128 (AES-128) technique to produce the second counter value in the encrypted form.

* * * * *